US012580512B2

(12) United States Patent
Tsai et al.

(10) Patent No.: US 12,580,512 B2
(45) Date of Patent: Mar. 17, 2026

(54) MOTOR DRIVER FOR ADJUSTING POWER BASED ON COMMON VOLTAGE

(71) Applicant: ANPEC ELECTRONICS CORPORATION, Hsinchu (TW)

(72) Inventors: Ming-Jung Tsai, Changhua County (TW); Huan-Chieh Chou, Taoyuan City (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 179 days.

(21) Appl. No.: 18/426,249

(22) Filed: Jan. 29, 2024

(65) Prior Publication Data

US 2025/0132715 A1 Apr. 24, 2025

(30) Foreign Application Priority Data

Oct. 20, 2023 (TW) ................................. 112140114

(51) Int. Cl.
*H02P 27/06* (2006.01)
*H02P 29/40* (2016.01)
(52) U.S. Cl.
CPC .............. *H02P 29/40* (2016.02); *H02P 27/06* (2013.01)
(58) Field of Classification Search
CPC ................................. H02P 29/40; H02P 27/08
See application file for complete search history.

(56) References Cited

U.S. PATENT DOCUMENTS

| | | | | |
|---|---|---|---|---|
| 6,331,757 B1 * | 12/2001 | Makaran | ................ | H02K 11/02 |
| | | | | 318/400.42 |
| 7,826,722 B2 * | 11/2010 | Lin | ........................ | H02P 7/2913 |
| | | | | 388/811 |
| 8,063,601 B2 * | 11/2011 | Chen | ........................ | H02P 7/285 |
| | | | | 388/825 |
| 8,581,534 B2 * | 11/2013 | Tsai | ........................... | H02P 7/29 |
| | | | | 318/400.26 |
| 8,841,876 B2 * | 9/2014 | Leaver | ...................... | H02P 6/15 |
| | | | | 318/807 |
| 10,978,973 B2 * | 4/2021 | Tsai | ........................... | H02P 6/28 |
| 2009/0251086 A1 * | 10/2009 | Sekimoto | ................ | H02P 29/50 |
| | | | | 318/400.23 |
| 2019/0190409 A1 * | 6/2019 | Imura | ............... | H02M 7/53875 |

* cited by examiner

*Primary Examiner* — Rina I Duda
(74) *Attorney, Agent, or Firm* — Li & Cai Intellectual Property Office

(57) ABSTRACT
A motor driver for adjusting power based on a common voltage is provided. The motor driver includes a common voltage difference calculation circuit, a duty cycle determination circuit, a signal generator circuit, a control circuit, a driver circuit and an output stage circuit. The common voltage difference calculation circuit calculates a difference between the common voltage received by the output stage circuit and a threshold. The duty cycle determination circuit determines a duty cycle adjustment value according to the difference. The signal generator circuit adjusts a plurality of waveform signals according to the duty cycle adjustment value. The control circuit outputs control signals according to the plurality of waveform signals. The driver circuit outputs driving signals according to the control signals. The output stage circuit operates to drive the motor according to the common voltage and the driving signals.

17 Claims, 6 Drawing Sheets

MOTOR DRIVER FOR ADJUSTING POWER BASED ON COMMON VOLTAGE

CROSS-REFERENCE TO RELATED PATENT APPLICATION

This application claims the benefit of priority to Taiwan Patent Application No. 112140114, filed on Oct. 20, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to motors, and more particularly to a motor driver for adjusting power based on common voltage.

BACKGROUND OF THE DISCLOSURE

In electronic equipment, fans are used to cool processors and other heat-generating components disposed within electronic devices. In order to enable the fan to quickly cool the heating component, in a conventional motor driver, the driver circuit provides a high-side conduction signal having high duty cycle to the high-side switch so as to maintain a turned on state of the high-side switch for a long period of time, thereby allowing more current to flow to the fan motor through the high-side switch and enabling the fan motor to run at high speed.

However, as the conventional motor driver continues to output a high duty cycle signal for driving the fan motor to run at high speed for a long period of time, a large current flows through the high-side switch and other circuit components to the motor in the conventional motor driver, causing the motor to be damaged due to excessive power consumption.

SUMMARY OF THE DISCLOSURE

In response to the above-referenced technical inadequacies, the present disclosure provides a motor driver for adjusting power based on a common voltage. The motor driver includes a common voltage difference calculation circuit, a duty cycle determination circuit, a signal generator circuit, a control circuit, a driver circuit and an output stage circuit. The common voltage threshold setting circuit is configured to set a voltage threshold. The common voltage difference calculation circuit is connected to the common voltage threshold setting circuit and configured to calculate a difference between a common voltage and the voltage threshold received from the common voltage difference calculation circuit to serve as a common voltage adjustment value. The duty cycle determination circuit is connected to the common voltage difference calculation circuit and configured to determine a duty cycle adjustment value according to the common voltage adjustment value received from the common voltage difference calculation circuit. The signal generator circuit is connected to the duty cycle determination circuit and configured to adjust a plurality of waveform signals according to the duty cycle adjustment value received from the duty cycle determination circuit, and output a plurality of adjusted waveform signals. The control circuit is connected to the signal generator circuit and configured to output a plurality of control signals according to the plurality of waveform signals received from the signal generator circuit. The driver circuit is connected to the control circuit and configured to output a plurality of driving signals according to the plurality of control signals received from the control circuit. The output stage circuit is coupled to the common voltage and connected to the driver circuit and a motor, and configured to drive the motor according to the common voltage and the plurality of driving signals received from the driver circuit.

As mentioned above, the present disclosure provides a motor driver for adjusting power based on a common voltage. In the motor driver of the present disclosure, the duty cycle of the control signal output by the control circuit of the motor is determined and adjusted according to the difference between the common voltage of the circuit components and the voltage threshold. In particular, when the common voltage of the circuit components of the motor driver of the present disclosure is higher than a voltage threshold and the duty cycle of the control signal is not lower than a duty cycle threshold, the duty cycle of the control signal is reduced. That is to say, the duty cycle of the signal output by the motor driver of the present disclosure for controlling the operation of the motor is not a constant value but modulates with changes in the common voltage to prevent the motor from being damaged due to excessive power consumption.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
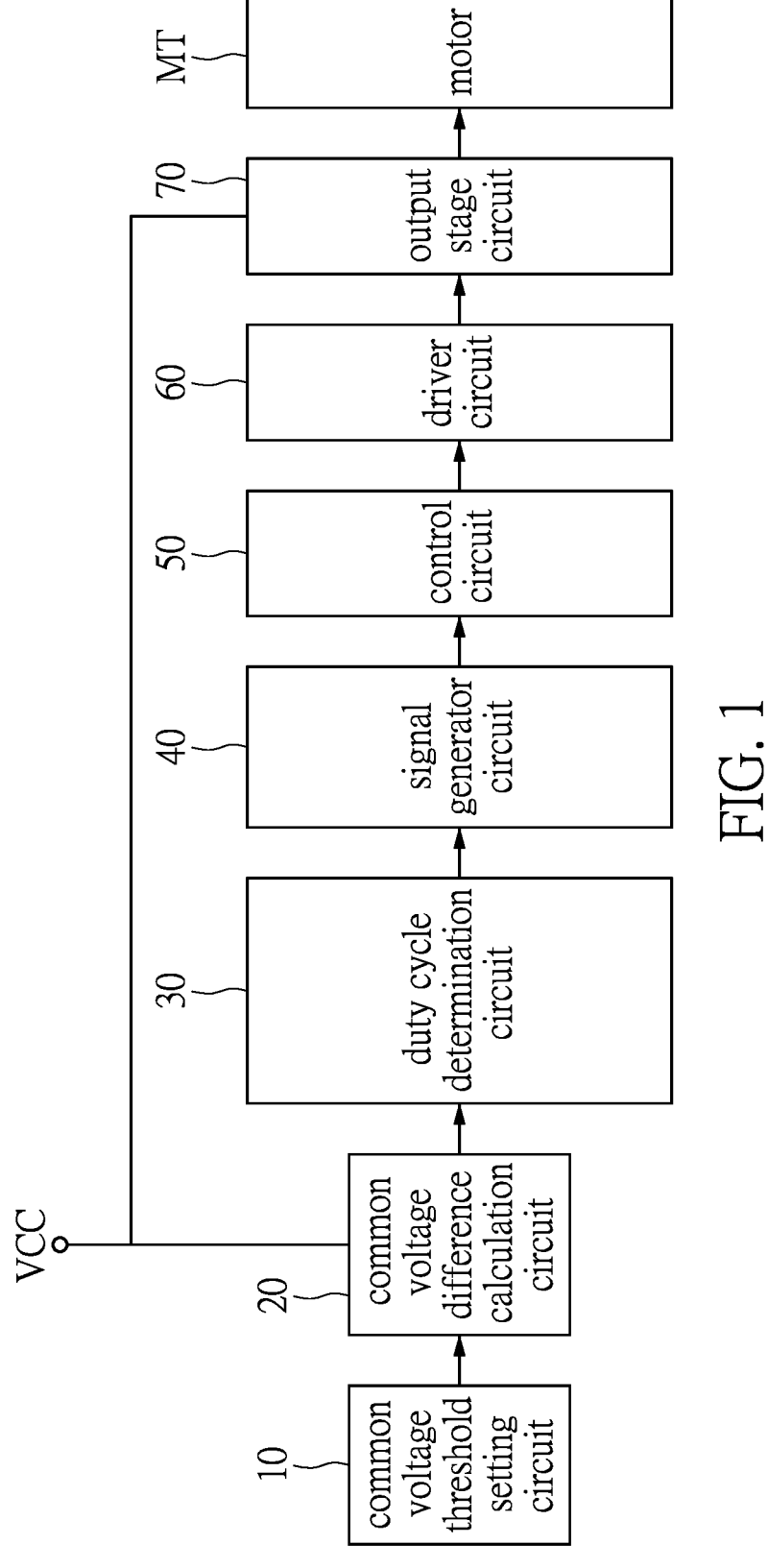
FIG. 1 is a block schematic diagram of a motor driver for adjusting power based on a common voltage according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether or not a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Figure 5:
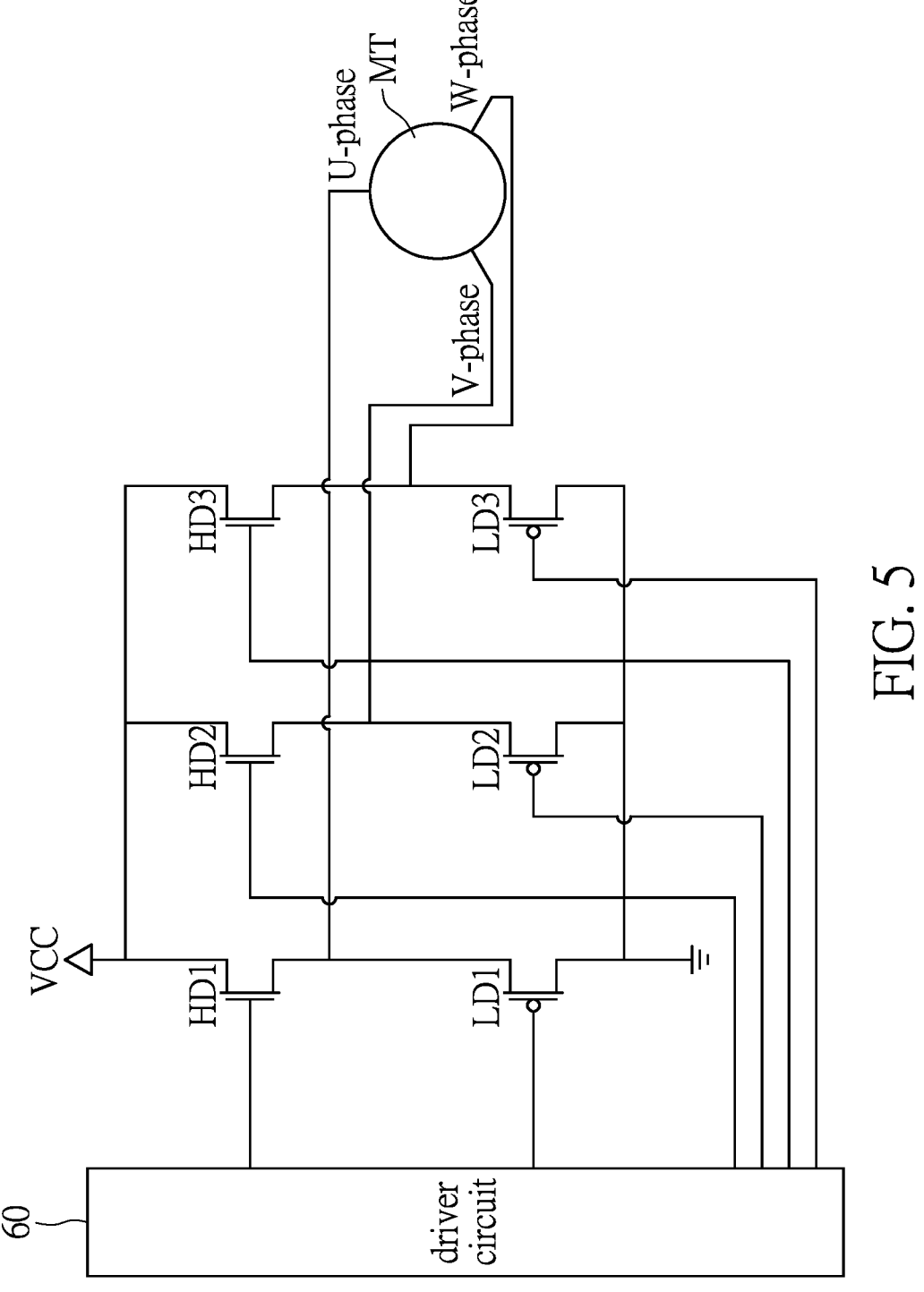
FIG. 5 is a block diagram of an output stage circuit of the motor driver for adjusting power based on a common voltage according to the first to fourth embodiments of the present disclosure.
Figure 6:
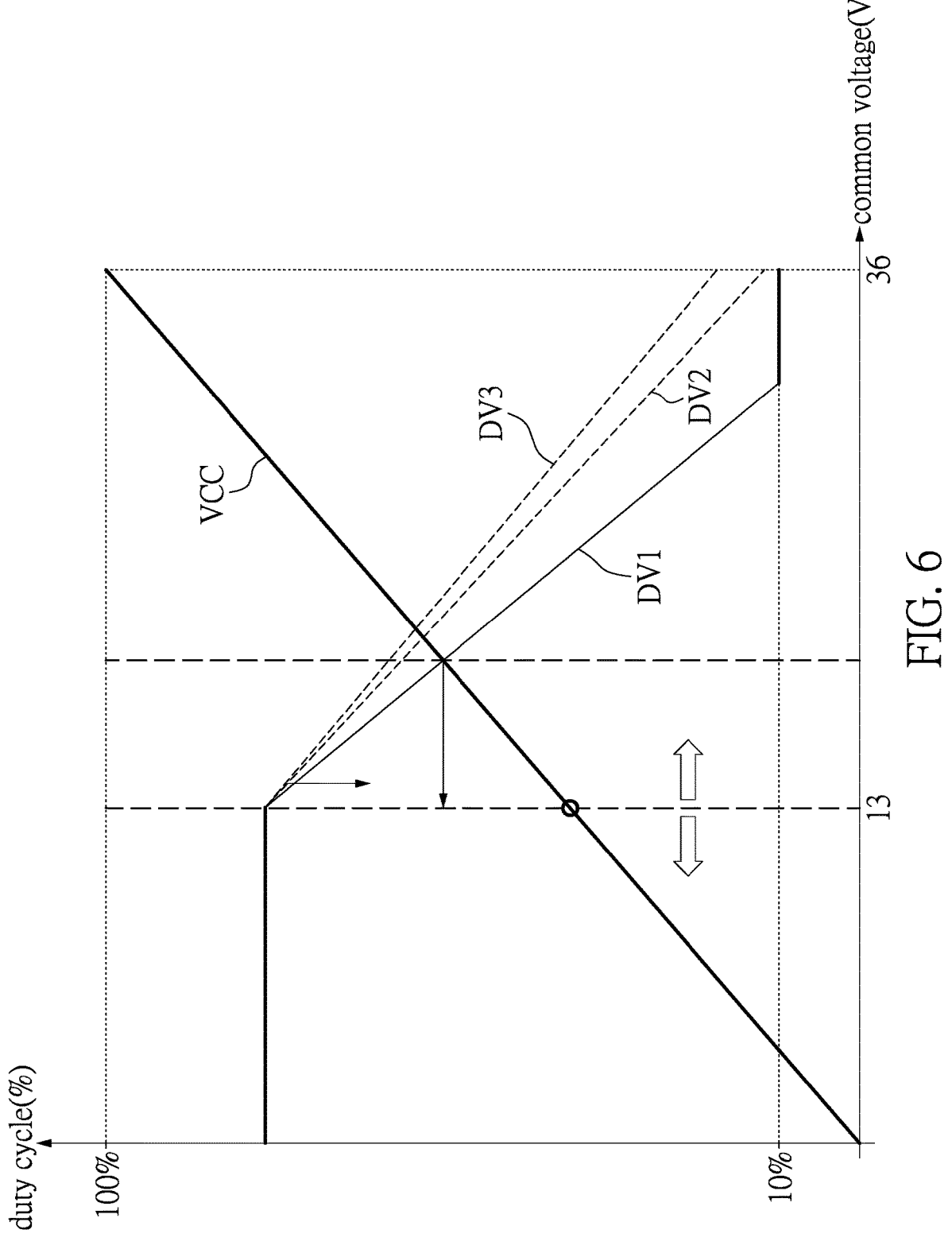
FIG. 6 is a schematic diagram showing a curve of a duty cycle of the motor driver for adjusting power based on a common voltage as the common voltage decreases according to the first to fourth embodiments of the present disclosure.

Reference is made to FIG. 1, FIG. 5 and FIG. 6. FIG. 1 is a block schematic diagram of a motor driver for adjusting power based on a common voltage according to a first embodiment of the present disclosure, FIG. 5 is a block diagram of an output stage circuit of the motor driver for adjusting power based on a common voltage according to the first to fourth embodiments of the present disclosure, and FIG. 6 is a schematic diagram showing a curve of a duty cycle of the motor driver for adjusting power based on a common voltage as the common voltage decreases according to the first to fourth embodiments of the present disclosure.

The motor driver of the present disclosure is used to drive the motor MT. In the present disclosure, the motor MT is a three-phase motor, but the present disclosure is not limited thereto. In practice, the motor MT driven by the motor driver of the present disclosure can also be a single-phase motor.

In the first embodiment, the motor driver of the present disclosure includes a plurality of circuit components, such as a common voltage threshold setting circuit 10, a common voltage difference calculation circuit 20, a duty cycle determination circuit 30, and a signal generator circuit 40, a control circuit 50, a driver circuit 60 and an output stage circuit 70 as shown in FIG. 1.

The control circuit 50 is connected to the driver circuit 60. The driver circuit 60 is connected to the output stage circuit 70, and the output stage circuit 70 is connected to the motor MT. The output stage circuit 70 may include a plurality of high-side switches and a plurality of low-side switches, and the plurality of high-side switches and the plurality of low-side switches may be, for example, a plurality of transistors.

If the motor MT used in the motor driver of the present disclosure is a three-phase motor, as shown in FIG. 5, the output stage circuit 70 may include a plurality of high-side switches and a plurality of low-side switches, which may be, but are not limited to being, a first high-side switch HD1, a second high-side switch HD2, a third high-side switch HD3, a first low-side switch LD1, a second low-side switch LD2 and a third low-side switch LD3.

A first terminal of the first high-side switch HD1 is coupled to a common voltage VCC. The first terminal of the first low-bridge switch LD1 is connected to a second terminal of the first high-side switch HD1. A node between the first terminal of the first low-bridge switch LD1 and the second terminal of the first high-side switch HD1 is connected to a first terminal of the motor MT (which may be, but are not limited to being a U-phase terminal of the three-phase motor). The second terminal of the first low-bridge switch LD1 is grounded.

A first terminal of the second high-side switch HD2 is coupled to the common voltage VCC. The first terminal of the second low-bridge switch LD2 is connected to a second terminal of the second high-side switch HD2. A node between the first terminal of the second low-bridge switch LD2 and the second terminal of the second high-side switch HD2 is connected to a second terminal of the motor MT (which may be, but are not limited to being a V-phase terminal of the three-phase motor). The second terminal of the second low-bridge switch LD2 is grounded.

A first terminal of the third high-side switch HD3 is coupled to the common voltage VCC. The first terminal of the third low-bridge switch LD3 is connected to a second terminal of the third high-side switch HD3. A node between the first terminal of the third low-bridge switch LD3 and the second terminal of the third high-side switch HD3 is connected to a third terminal of the motor MT (which may be, but are not limited to being a W-phase terminal of the three-phase motor). The second terminal of the third low-bridge switch LD3 is grounded.

A control terminal of the first high-side switch HD1, a control terminal of the first low-bridge switch LD1, a control terminal of the second high-side switch HD2, a control terminal of the second low-bridge switch LD2, a control terminal of the third high-side switch HD3 and a control terminal of the third low-bridge switch LD3 are connected to an output terminal of the driver circuit 60.

It is worth noting that the motor driver of the present disclosure includes a common voltage threshold setting circuit 10, a common voltage difference calculation circuit 20, a duty cycle determination circuit 30, and a signal generator circuit 40, and the common voltage VCC coupled to the output stage circuit 70 (the first terminal of the first high-side switch HD1, the first terminal of the second high-side switch HD2 and the first terminal of the third high-side switch HD3) and used to determine the duty cycle of the control signal output by the control circuit 50 as shown in FIG. 1 is detailed below.

The common voltage difference calculation circuit 20 is connected to the common voltage threshold setting circuit 10 and the duty cycle determination circuit 30. The signal generator circuit 40 is connected to the duty cycle determination circuit 30 and the control circuit 50.

The common voltage threshold setting circuit 10 sets a voltage threshold.

The common voltage difference calculation circuit 20 can determine whether or not the common voltage VCC coupled to the output stage circuit 70 (the first terminal of the first high-side switch HD1, the first terminal of the second high-side switch HD2 and the first terminal of the third high-side switch HD3) is currently higher than a voltage threshold (which may be, but are not limited to being 13V as shown in FIG. 6) to determine whether or not it is necessary to adjust the duty cycle of the control signal output by the control circuit 50 to the driver circuit 60 to determine whether or not to calculate a common voltage adjustment value accordingly.

When the common voltage VCC coupled to the output stage circuit 70 (the first terminal of the first high-side switch HD1, the first terminal of the second high-side switch HD2 and the first terminal of the third high-side switch HD3) is currently higher than a voltage threshold, the common voltage difference calculation circuit 20 calculates the difference between the common voltage VCC and a voltage threshold received from the common voltage threshold setting circuit 10 as a common voltage adjustment value.

In the first embodiment of the present disclosure, the common voltage difference calculation circuit 20 subtracts a voltage threshold from the current voltage value of the common voltage VCC coupled to the output stage circuit 70 (the first terminal of the first high-side switch HD1, the first terminal of the second high-side switch HD2 and the first terminal of the third high-side switch HD3) to calculate a common voltage adjustment value.

The duty cycle determination circuit 30 determines a duty cycle adjustment value according to a common voltage adjustment value received from the common voltage difference calculation circuit 20.

For example, the duty cycle determination circuit 30 can set a slope of a preset curve (such as a preset curve DV1, DV2 or DV3 as shown in FIG. 6) in which the duty cycle decreases with the increase of the common voltage VCC as a preset adjustment ratio. The duty cycle determination circuit 30 may multiply a common voltage adjustment value received from the common voltage difference calculation circuit 20 by the preset adjustment ratio to calculate a duty cycle adjustment value.

The duty cycle determination circuit 30 can subtract a calculated duty cycle adjustment value from a current duty cycle to calculate the next duty cycle of the control signal that the control circuit 50 will next output to the driver circuit 60. The current duty cycle is the duty cycle that the duty cycle calculation circuit 303 currently outputs to the signal generator circuit 40 or the duty cycle of the control signal that the control circuit 50 currently outputs to the driver circuit 60.

The signal generator circuit 40 adjusts the preset plurality of waveform signals or a plurality of previously output waveform signals according to the next duty cycle (or the duty cycle adjustment value) received from the duty cycle determination circuit 30. The signal generator circuit 40 outputs a plurality of adjusted waveform signals.

The control circuit 50 outputs a plurality of control signals according to a plurality of waveform signals received from the signal generator circuit 40. Specifically, the control circuit 50 may compare a plurality of parameter values (such as a plurality of voltage values) of a plurality of waveforms received from the signal generator circuit 40 with each other to determine the duty cycle of a plurality of control signals.

The driver circuit 60 respectively outputs a plurality of driving signals to the output stage circuit 70 (a plurality of high-side switches and a plurality of low-side switches, for example, the first high-side switch HD1, the second high-side switch HD2, the third low-side switch LD3, the first low-side switch LD, the second low-side switch LD2 and the third low-side switch LD3) according to a plurality of control signals received from the control circuit 50.

The output stage circuit 70 (a plurality of high-side switches and a plurality of low-side switches, for example, the first high-side switch HD1, the second high-side switch HD2, the third low-side switch LD3, the first low-side switch LD, the second low-side switch LD2 and the third low-side switch LD3) can operate according to the common voltage VCC and a plurality of driving signals received from the driver circuit 60, thereby driving the connected motor MT.

For example, the output stage circuit 70 (e.g., the first high-side switch HD1, the second high-side switch HD2 and the third low-side switch LD3) is turned on within the duty cycles of a plurality of driving signals respectively received. In this case, when a common voltage VCC coupled to the first terminal of the first high-side switch HD1, the first terminal of the second high-side switch HD2, and the first terminal of the third high-side switch HD3 of the output stage circuit 70 is currently higher than a voltage threshold, the control circuit 50 decreases the duty cycle of one or more control signals output to the driver circuit 60 according to a plurality of waveform signals received from the signal generator circuit 40. As a result, it is possible to prevent the motor from being damaged due to excessive power consumption.

If the common voltage VCC is equal to 12V and the duty cycle of the control signal output by the motor driver is 50%, the equivalent average voltage provided to the motor MT is 12×0.5=6 (V). If the common voltage VCC is equal to 24V and the control signal output by the motor driver is 50%, the equivalent average voltage provided to the motor MT is 24×0.5=12 (V). At this time, the current flowing through the motor MT becomes larger, thus causing the motor MT to burn out.

For example, after the common voltage VCC is greater than 12V (i.e., the above-mentioned voltage threshold), the duty cycle of the control signal output by the motor driver of the present disclosure starts to decrease. In this case, when the common voltage VCC reaches 24V, the duty cycle of the control signal output by the motor driver of the present disclosure is reduced to 25%, and the equivalent average voltage provided to the motor MT is only 24×0.25=6 (V), such that the current flowing through the motor MT remains unchanged, and the motor MT will not burn out.

Figure 2:
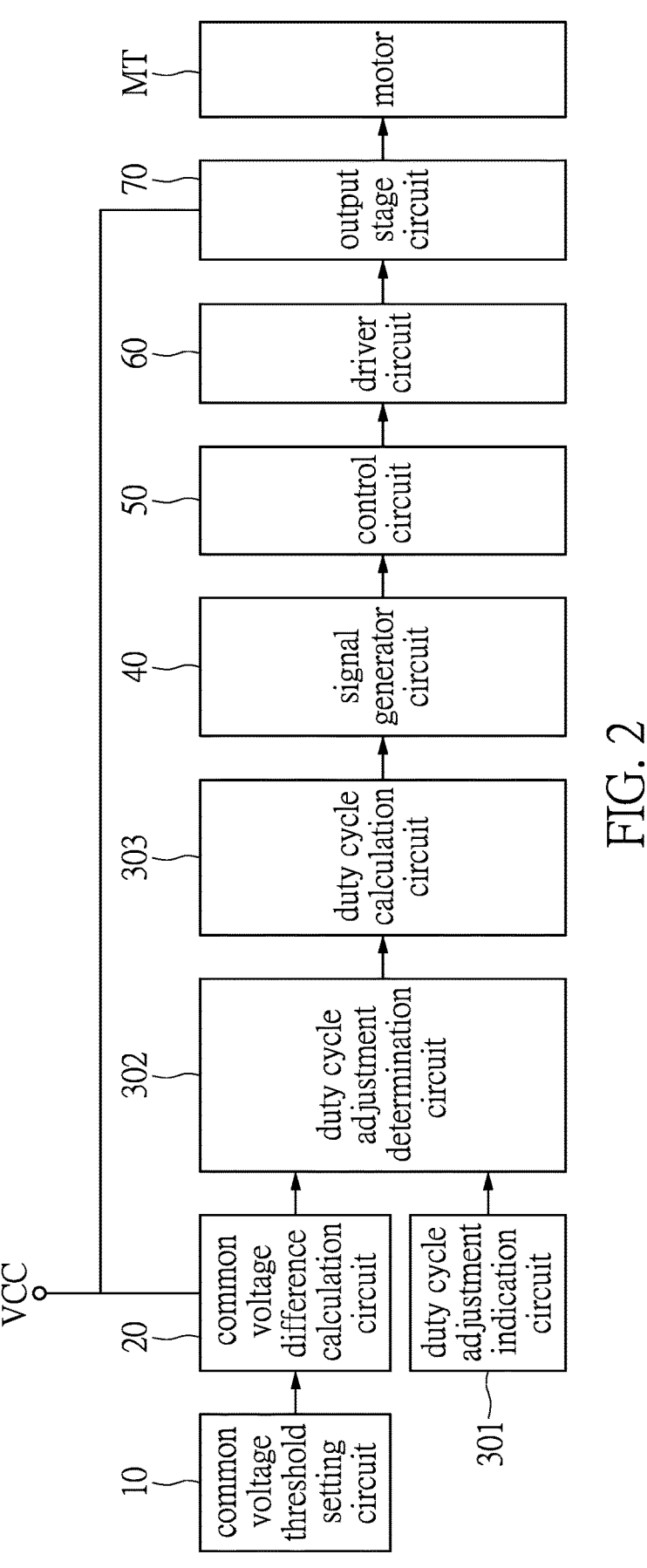
FIG. 2 is a block diagram of a motor driver for adjusting power based on a common voltage according to a second embodiment of the present disclosure.

Reference is made to FIGS. 2 and 5. FIG. 2 is a block diagram of a motor driver for adjusting power based on a common voltage according to a second embodiment of the present disclosure.

Similar descriptions between the second embodiment of the present disclosure and the first embodiment are not reiterated hereinafter.

In the second embodiment, the duty cycle determination circuit of the motor driver of the present disclosure (such as the duty cycle determination circuit 30 as shown in FIG. 1) includes a duty cycle adjustment indication circuit 301 and a duty cycle adjustment determination circuit 302 as shown in FIG. 2. If necessary, the duty cycle determination circuit of the motor driver of the present disclosure may further include a duty cycle calculation circuit 303 as shown in FIG. 2.

The duty cycle adjustment determination circuit 302 is connected to the common voltage difference calculation circuit 20, the duty cycle adjustment instruction circuit 301 and the duty cycle calculation circuit 303. The duty cycle calculation circuit 303 is connected to the signal generator circuit 40.

The duty cycle adjustment indication circuit 301 can set a preset adjustment ratio.

For example, the duty cycle adjustment indication circuit 301 (which may be, but are not limited to being a selector circuit) can select one of a plurality of reference adjustment ratios as a preset adjustment ratio. Alternatively, the duty cycle adjustment indication circuit 301 may select one of a plurality of preset curves (such as a plurality of preset curves DV1, DV2, and DV3 as shown in FIG. 6), and use the slope of the selected one as a preset adjustment ratio.

The duty cycle adjustment determination circuit 302 (which may be, but are not limited to being a multiplier) may multiply a common voltage adjustment value received from the common voltage difference calculation circuit 20 by a preset adjustment ratio received from the duty cycle adjustment indication circuit 301 to calculate a duty cycle adjustment value.

The duty cycle calculation circuit 303 can adjust a current duty cycle to a specified duty cycle according to a duty cycle adjustment value received from the duty cycle adjustment determination circuit 302. For example, the duty cycle calculation circuit 303 (which may be, but are not limited to being a subtractor) subtracts a duty cycle adjustment value from a current duty cycle. The current duty cycle is the duty cycle that the duty cycle calculation circuit 303 currently outputs to the signal generator circuit 40 or the duty cycle of the control signal that the control circuit 50 currently outputs to the driver circuit 60.

The signal generator circuit 40 determines a plurality of parameter values of a plurality of waveform signals according to a specified duty cycle received from the duty cycle calculation circuit 303, and then sets the duty cycle of the control signal output by the control circuit 50 to the driver circuit 60.

Figure 3:
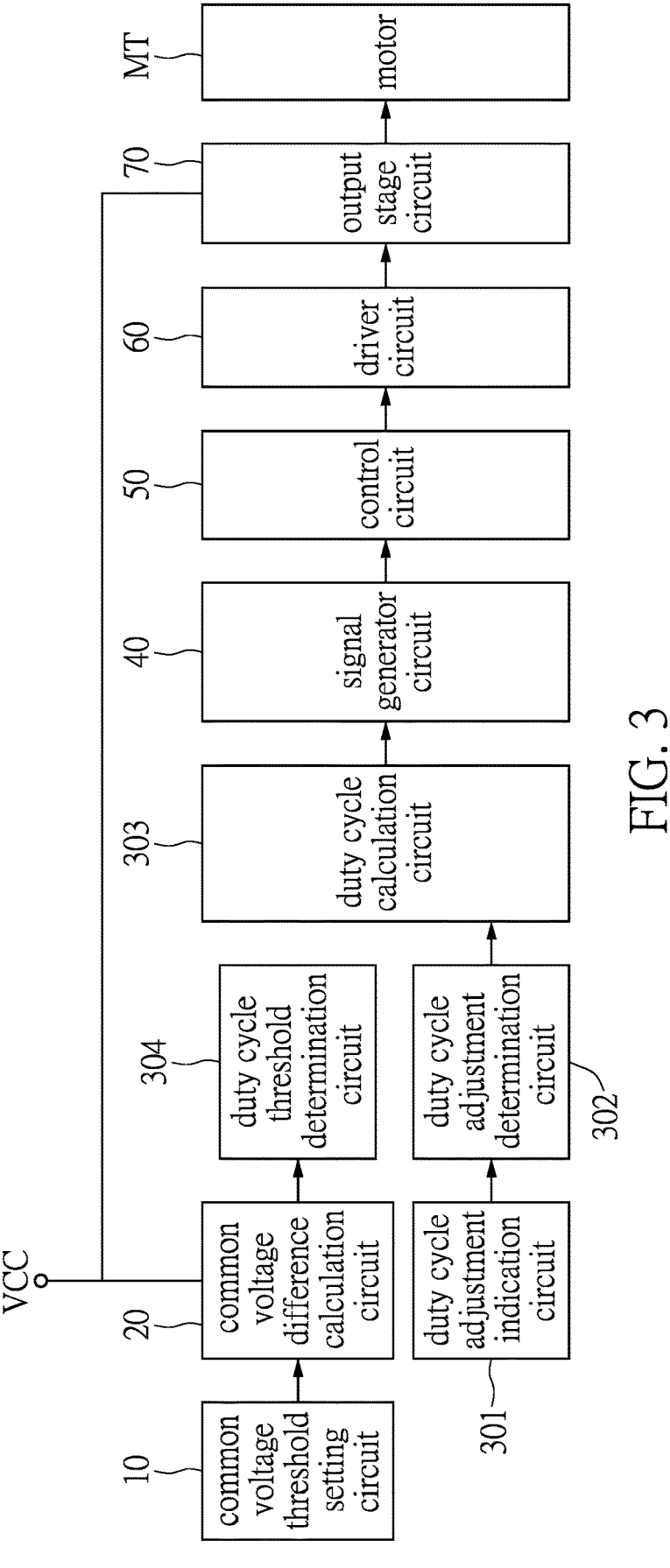
FIG. 3 is a block diagram of a motor driver for adjusting power based on a common voltage according to a third embodiment of the present disclosure.

Reference is made to FIG. 3, which is a block diagram of a motor driver for adjusting power based on a common voltage according to a third embodiment of the present disclosure. Descriptions of the third embodiment of the present disclosure that are similar to those of the first and second embodiments will not be reiterated hereinafter.

In the third embodiment, the duty cycle determination circuit of the motor driver of the present disclosure (such as the duty cycle determination circuit 30 as shown in FIG. 1) further includes a duty cycle threshold determination circuit 304 as shown in FIG. 3.

The duty cycle threshold determination circuit 304 may be connected to the duty cycle calculation circuit 303.

The duty cycle threshold determination circuit 304 sets a duty cycle threshold and outputs the determined duty cycle threshold to the duty cycle calculation circuit 303.

For example, the duty cycle threshold determination circuit 304 (which may be, but are not limited to being a selector circuit) can select one of a plurality of reference duty cycles as a duty cycle threshold output to the duty cycle calculation circuit 303.

The duty cycle calculation circuit 303 may determine whether or not the current duty cycle is lower than the duty cycle threshold received from the duty cycle threshold determination circuit 304 to determine whether or not to adjust the current duty cycle. The current duty cycle is the duty cycle that the duty cycle calculation circuit 303 currently outputs to the signal generator circuit 40 or the duty cycle of the control signal that the control circuit 50 currently outputs to the driver circuit 60.

When the common voltage VCC coupled to the output stage circuit 70 (the first terminal of the first high-side switch HD1, the first terminal of the second high-side switch HD2 and the first terminal of the third high-side switch HD3) is currently high and a current duty cycle is not lower than a duty cycle threshold (which may be, but are not limited to being 10% as shown in FIG. 5), the duty cycle calculation circuit 303 subtracts the duty cycle adjustment value from the duty cycle output to the signal generator circuit 40, thereby reducing the duty cycle of the control signal output from the control circuit 50 to the driver circuit 60.

On the contrary, when the current duty cycle is lower than a duty cycle threshold (which may be, but are not limited to being 10% as shown in FIG. 6), the duty cycle calculation circuit 303 does not reduce the duty cycle of the duty cycle calculation circuit 303 output to the signal generator circuit 40.

Additionally or alternatively, the duty cycle calculation circuit 303 determines whether or not a current duty cycle subtracted by a duty cycle adjustment value received from the duty cycle adjustment determination circuit 302 is lower than a duty cycle threshold to determine whether or not to reduce the current duty cycle.

When a common voltage VCC coupled to the output stage circuit 70 (the first terminal of the first high-side switch HD1, the first terminal of the second high-side switch HD2 and the first terminal of the third high-side switch HD3) is currently high and a current duty cycle subtracted by a duty cycle adjustment value is not lower than a duty cycle threshold (which may be, but are not limited to being 10% as shown in FIG. 6), the duty cycle calculation circuit 303 subtracts a duty cycle adjustment value from the duty cycle output to the signal generator circuit 40, thereby reducing the duty cycle of the control signal output from the control circuit 50 to the driver circuit 60.

On the contrary, when a current duty cycle subtracted by a duty cycle adjustment value is lower than a duty cycle threshold, the duty cycle calculation circuit 303 does not adjust a current duty cycle or only reduces a current duty cycle to be equal to a duty cycle threshold.

Figure 4:
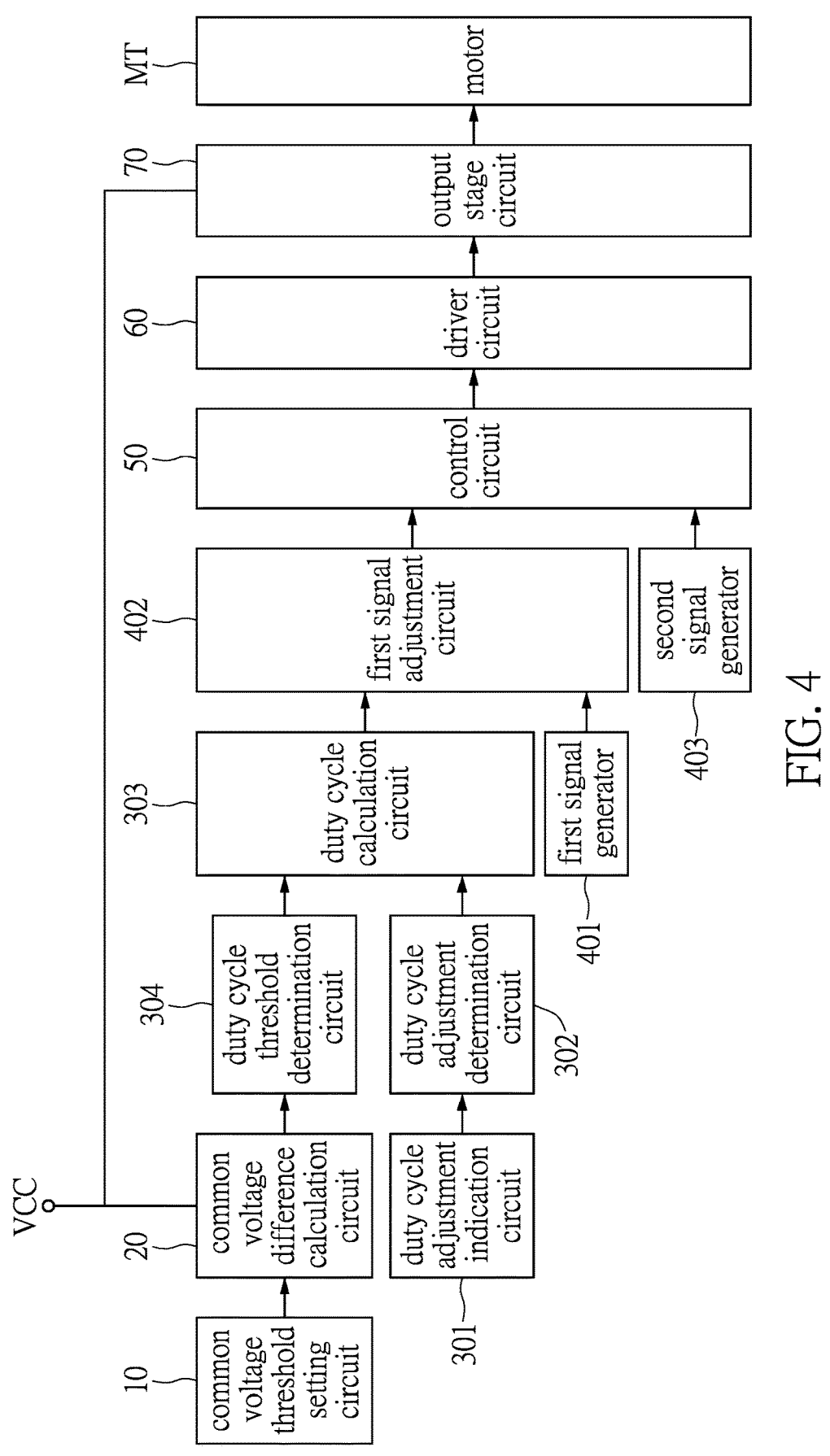
FIG. 4 is a block diagram of a motor driver for adjusting power based on a common voltage according to a fourth embodiment of the present disclosure.

Reference is made to FIG. 4, which is a block diagram of a motor driver for adjusting power based on a common voltage according to a fourth embodiment of the present disclosure. Descriptions of the fourth embodiment of the present disclosure that are similar to those of the first to third embodiments will not be reiterated hereinafter.

In the fourth embodiment, the signal generator circuit of the motor driver of the present disclosure as shown in FIG. 4 (such as the signal generator circuit 40 as shown in FIG. 1) includes a first signal generator 401, a first signal adjustment circuit 402 and a second signal generator 403.

The first signal adjustment circuit 402 is connected to the duty cycle calculation circuit 303, the first signal generator 401 and the control circuit 50. The second signal generator 403 is connected to the control circuit 50.

The first signal generator 401 can output a plurality of first waveform signals, which are such as, but not limited to, a plurality of sinusoidal waveforms, a plurality of third harmonic waveforms or a combination thereof.

The first signal adjustment circuit 402 can adjust a plurality of reference values of a plurality of first waveform signals received from the first signal generator 401 according to a duty cycle adjustment value received from the duty cycle calculation circuit 303.

The control circuit 50 can output a plurality of control signals according to a plurality of first waveform signals adjusted by the first signal adjustment circuit 402.

The second signal generator 403 can output a plurality of second waveform signals, which are such as, but not limited to, a plurality of triangular waveforms, a plurality of saw-tooth waveforms or a combination thereof.

The control circuit 50 can compare a plurality of parameter values (such as a plurality of voltage values) of a plurality of first waveform signals adjusted by the first signal adjustment circuit 402 with a plurality of parameter values (such as multiple voltage values) of a plurality of second waveform signals output by the second signal generator 403 each other to determine the levels of a plurality of control signals output to the driver circuit 60, so as to determine the duty cycles of a plurality of control signals.

If the motor MT controlled by the motor driver of the present disclosure is a three-phase motor, a plurality of first waveform signals output by the first signal generator 401 may include three first waveform signals, which are the U-phase, V-phase and W-phase respectively used for the motor MT. A plurality of second waveform signals output by the second signal generator 403 may include three second waveform signals, which are the U-phase and V-phase and W-phase respectively used for the motor MT.

The control circuit 50 compares a plurality of parameter values of the first waveform signal and the second waveform signal for the U-phase of the motor MT with each other to output a control signal for the U-phase of the motor MT. In addition, the control circuit 50 compares a plurality of parameter values of the first waveform signal and the second waveform signal for the V phase of the motor MT with each other to output another control signal for the V phase of the motor MT. Furthermore, the control circuit 50 compares a plurality of parameter values of the first waveform signal and the second waveform signal for the W-phase of the motor MT with each other to output yet another control signal for the W-phase of the motor MT.

In summary, the present disclosure provides a motor driver for adjusting power based on a common voltage. In the motor driver of the present disclosure, the duty cycle of the control signal output by the control circuit of the motor is determined and adjusted according to the difference between the common voltage of the circuit components and the voltage threshold. In particular, when the common voltage of the circuit components of the motor driver of the present disclosure is higher than a voltage threshold and the duty cycle of the control signal is not lower than a duty cycle threshold, the duty cycle of the control signal is reduced, so as to reduce the power of the motor driver of the present disclosure. That is to say, the duty cycle of the signal output by the motor driver of the present disclosure for controlling the operation of the motor is not a constant value but modulates with changes in the common voltage, thereby preventing the motor of the present disclosure from being damaged due to excessive power consumption.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A motor driver for adjusting power based on a common voltage, including:
   a common voltage threshold setting circuit configured to set a voltage threshold;
   a common voltage difference calculation circuit connected to the common voltage threshold setting circuit and configured to calculate a difference between a common voltage and the voltage threshold received from the common voltage difference calculation circuit to serve as a common voltage adjustment value;
   a duty cycle determination circuit connected to the common voltage difference calculation circuit and configured to determine a duty cycle adjustment value according to the common voltage adjustment value received from the common voltage difference calculation circuit;
   a signal generator circuit connected to the duty cycle determination circuit and configured to adjust a plurality of waveform signals according to the duty cycle adjustment value received from the duty cycle determination circuit, and output a plurality of adjusted waveform signals;
   a control circuit connected to the signal generator circuit and configured to output a plurality of control signals according to the plurality of waveform signals received from the signal generator circuit;
   a driver circuit connected to the control circuit and configured to output a plurality of driving signals according to the plurality of control signals received from the control circuit; and
   an output stage circuit coupled to the common voltage and connected to the driver circuit and a motor and configured to drive the motor according to the common voltage and the plurality of driving signals received from the driver circuit;
   wherein the duty cycle determination circuit is configured to set a plurality of preset curves, each having a slope in which a duty cycle decreases with an increase of the common voltage, and the slopes of the plurality of preset curves are different from each other;
   wherein the duty cycle determination circuit is configured to select one of the plurality of preset curves as a preset adjustment ratio, and calculate the common voltage adjustment value by multiplying the duty cycle adjustment value by the preset adjustment ratio.

2. The motor driver according to claim 1, wherein the common voltage difference calculation circuit subtracts the voltage threshold from the common voltage coupled to the output stage circuit to calculate the common voltage adjustment value.

3. The motor driver according to claim 1, wherein the common voltage difference calculation circuit determines whether or not the common voltage coupled to the output stage circuit is currently higher than the voltage threshold to determine whether or not to calculate the common voltage adjustment value.

4. The motor driver according to claim 3, wherein, when the common voltage coupled to the output stage circuit is higher than the voltage threshold, the common voltage difference calculation circuit calculates the common voltage adjustment value, and the control circuit reduces a duty cycle of each of the control signals output to the driver circuit.

5. The motor driver according to claim 1, wherein the duty cycle determination circuit includes:

a duty cycle adjustment indication circuit configured to set a plurality of preset curves and select one of the plurality of preset curves as the preset adjustment ratio; and a duty cycle adjustment determination circuit connected to the duty cycle adjustment indication circuit and the common voltage difference calculation circuit, and configured to multiply the common voltage adjustment value received from the common voltage difference calculation circuit by the preset adjustment ratio received from the duty cycle adjustment indication circuit to calculate the duty cycle adjustment value.

6. The motor driver according to claim 5, wherein the duty cycle determination circuit further includes:

a duty cycle calculation circuit connected to the duty cycle adjustment determination circuit and the signal generator circuit, and configured to adjust a current duty cycle to a specified duty cycle according to the duty cycle adjustment value received from the duty cycle adjustment determination circuit, wherein the signal generator circuit determines a plurality of parameter values of the plurality of waveform signals according to the specified duty cycle received from the duty cycle calculation circuit.

7. The motor driver according to claim 6, further including:

a duty cycle threshold determination circuit connected to the duty cycle calculation circuit and configured to set a duty cycle threshold, wherein the duty cycle calculation circuit determines whether or not the current duty cycle is lower than the duty cycle threshold received from the duty cycle threshold determination circuit to determine whether or not to adjust the current duty cycle.

8. The motor driver according to claim 7, wherein, when the common voltage is higher than the voltage threshold and the current duty cycle is not lower than the duty cycle threshold, the duty cycle calculation circuit reduces the current duty cycle, and wherein, when the current duty cycle is lower than the duty cycle threshold, the duty cycle calculation circuit does not reduce the current duty cycle.

9. The motor driver according to claim 6, wherein the duty cycle calculation circuit subtracts the duty cycle adjustment value from the current duty cycle, and the duty cycle calculation circuit determines whether or not the current duty cycle subtracted by an adjusted duty cycle adjustment value is lower than the duty cycle threshold to determine whether or not to reduce the current duty cycle.

10. The motor driver according to claim 9, wherein, when the common voltage is higher than the voltage threshold and the adjusted duty cycle adjustment value is not lower than the duty cycle threshold, the duty cycle calculation circuit reduces the current duty cycle, and wherein, when the common voltage is higher than the voltage threshold and the current duty cycle subtracted by the adjusted duty cycle adjustment value is lower than the duty cycle threshold, the duty cycle calculation circuit does not reduce the current duty cycle or only reduces the current duty cycle to be equal to the duty cycle threshold.

11. The motor driver according to claim 1, wherein the control circuit compares the plurality of parameter values of a plurality of waveforms of the plurality of waveform signals received from the signal generator circuit with each other to determine a duty cycle of each of the control signals.

12. The motor driver according to claim 1, wherein the output stage circuit includes:

a first high-side switch, wherein a first terminal of the first high-side switch is coupled to the common voltage;

a first low-side switch, wherein the first terminal of the first low-side switch is connected to a second terminal of the first high-side switch, a node between the first terminal of the first low-side switch and the second terminal of the first high-side switch is connected to a first terminal of the motor, and the second terminal of the first low-side switch is grounded;

a second high-side switch, wherein a first terminal of the second high-side switch is coupled to the common voltage;

a second low-side switch, wherein a first terminal of the second low-side switch is connected to a second terminal of the second high-side switch, and a node between the first terminal of the second low-side switch and the second terminal of the second high-side switch is connected to the second terminal of the motor, and the second terminal of the second low-side switch is grounded; and wherein a control terminal of the first high-side switch, a control terminal of the first low-side switch, a control terminal of the second high-side switch and a control terminal of the second low-side switch are connected to an output terminal of the driver circuit.

13. The motor driver according to claim 12, wherein the output stage circuit further includes:

a third high-side switch, wherein a first terminal of the third high-side switch is coupled to the common voltage;

a third low-side switch, wherein a first terminal of the third low-side switch is connected to a second terminal of the third high-side switch, a node between the first terminal of the third low-side switch and the second terminal of the third high-side switch is connected to a third terminal of the motor, and a second terminal of the third low-side switch is grounded; and wherein a control terminal of the third high-side switch and a control terminal of the third low-side switch are connected to an output terminal of the driver circuit.

14. The motor driver according to claim 13, wherein the common voltage difference calculation circuit subtracts the voltage threshold value from the common voltage coupled to the first terminal of the first high-side switch, the first terminal of the second high-side switch and the first terminal of the third high-side switch to calculate the common voltage adjustment value.

15. The motor driver according claim 1, wherein the signal generator circuit includes:

a first signal generator configured to output a plurality of first waveform signals;

a first signal adjustment circuit connected to the first signal generator, the duty cycle determination circuit and the control circuit, and configured to adjust the plurality of first waveform signals received from the first signal generator according to the duty cycle adjustment value received from the duty cycle determination circuit; and wherein the control circuit outputs the plurality of control signals according to the plurality of first waveform signals adjusted by the first signal adjustment circuit.

16. The motor driver according to claim 15, wherein the signal generator circuit further includes:

a second signal generator connected to the control circuit and configured to output a plurality of second waveform signals;

wherein the control circuit compares a plurality of parameter values of the plurality of first waveform signals adjusted by the first signal adjustment circuit with a plurality of parameter values of the plurality of second waveform signals to determine a duty cycle of each of the control signals.

17. The motor driver according to claim 16, wherein the plurality of waveform signals include the plurality of first waveform signals and the plurality of second waveform signals; the plurality of first waveform signals include a plurality of sinusoidal waveforms, a plurality of third harmonic waveforms or a combination thereof, and the plurality of second waveform signals include a plurality of triangular waveforms, a plurality of sawtooth waveforms or a combination thereof.

\* \* \* \* \*